United States Patent [19]
Pettit et al.

[11] Patent Number: 5,353,590
[45] Date of Patent: Oct. 11, 1994

[54] EXHAUST HEATING CONTROL

[75] Inventors: William H. Pettit; Daniel F. Kabasin, both of Rochester; Donald D. Stoltman, Henrietta; Kenneth J. Dauer, Avon, all of N.Y.

[73] Assignee: General Motors Corporation, Detroit, Mich.

[21] Appl. No.: 108,252

[22] Filed: Aug. 19, 1993

[51] Int. Cl.$^5$ ............................................. F01N 3/20
[52] U.S. Cl. ..................................... 60/274; 60/283; 60/286; 60/303
[58] Field of Search .................. 60/274, 286, 283, 303

[56] References Cited
U.S. PATENT DOCUMENTS

3,618,314 11/1971 Krebs ................................... 60/303
3,908,371 9/1975 Nagai ................................... 60/286
3,911,675 10/1975 Mondt ................................... 60/283
4,615,173 10/1986 Usui ...................................... 60/286

Primary Examiner—Douglas Hart
Attorney, Agent, or Firm—Michael J. Bridges

[57] ABSTRACT

Control of a fuel quantity and an air quantity delivered to an exhaust gas heater is provided by determining a desired heater air quantity and a desired heater air/fuel ratio both of which may vary over multiple control states, by commanding an air rate in accord with the desired heater air quantity, by adjusting the commanded air quantity in accord with a sensed actual air quantity, and by commanding a fuel quantity in accord with the desired heater air/fuel ratio and either the desired heater air quantity or the sensed actual air quantity.

8 Claims, 6 Drawing Sheets

EXHAUST HEATING CONTROL

FIELD OF THE INVENTION

The present invention relates to internal combustion engine emission control and, more particularly, to control of an engine exhaust gas heating apparatus.

BACKGROUND OF THE INVENTION

Engine exhaust gas may be passed through a catalyst treatment device called a catalytic converter, to reduce emission of undesirable exhaust gas constituents, such as hydrocarbons, carbon monoxide, and oxides of nitrogen. To become catalytically active following a cold start of the engine, catalytic converters rely on heat energy in the exhaust gas passing therethrough. Initiation of catalyst activity occurs at converter light-off temperature, which is typically around 400 degrees Celsius. Following a cold start, the engine may have to operate for over 100 seconds before heat energy transferred from the engine exhaust to the converter elevates the converter temperature to light-off, such that efficient conversion may occur.

To reduce the period of time before the light-off temperature is reached after a cold start, exhaust gas heating devices may be provided to introduce additional heat energy in the engine exhaust gas path after a cold start. Heaters have been considered for exhaust gas heating in which an air/fuel mixture is combusted and the combustion heat energy therefrom drawn into the engine exhaust gas path. To minimize the time to catalyst light-off, such heaters must be ignited as soon as possible after a start time, and once ignited, must be operated in a manner wherein maximum heat energy is transferred to such heaters must be ignited as soon as possible after a start time, and once ignited, must be operated in a manner wherein maximum heat energy is transferred to the engine exhaust path and ultimately to the converter.

To provide for rapid heater ignition, it has been proposed to apply open loop control to a rate at which air and fuel are admitted to the heater until such time as ignition is detected in the heater. Open loop control of fuel and air are continued after ignition is detected in such an approach, for a period of time until catalytic converter temperature has been increased to a desirable temperature, and maintained at that temperature for a period of time after which it may be assumed that converter temperature may be maintained solely through engine exhaust gas heat energy transfer.

The conditions under which an exhaust gas heating system operates may change significantly. For example, exhaust gas pressure perturbations, system temperature and system voltage can change dramatically over the course of even a single heater heating cycle. Furthermore, as the heating system ages, the efficiency of its parts, especially its actuators may deteriorate, and contamination may build up in the system. A significant effect of these changing operating conditions is that an open loop command, such as the open loop fuel and air command of the above-described prior art, may not result in a constant or predictable delivery of fuel or air to the heating system. Accordingly, actual air/fuel ratio in the heater may deviate from a beneficial air/fuel ratio, or heat energy generated by the heater may vary from a beneficial energy level. In such cases, the time to reach light-off may be increased, or, in extreme cases of overheating, catalytic converter damage may result.

Accordingly, it would be desirable to close the loop on exhaust gas heater input parameters, such as air or fuel delivered, for application in a control capable of adjusting the quantity of air or fuel commanded to the heater in response thereto. Additionally, it would be desirable to operate a heating system so as to reduce system contamination for increased accuracy over the life of the system.

SUMMARY OF THE INVENTION

The present invention overcomes the limitations of the described prior art by providing closed loop control of exhaust gas heater parameters. Additionally, the invention takes affirmative steps to minimize system contamination.

More specifically, the present invention controls fuel and air to an exhaust gas heater in response to a predetermined set of engine parameters indicative of an engine operating level. Air to the heater is controlled in accord with a desired air quantity that may vary over a heating cycle, as the needs of the heater vary. Fuel is controlled in accord with the desired air quantity and a desired air/fuel ratio that may vary over the heating cycle as the needs of the heating system vary.

Still further, the fuel and air control may be adjusted in accord with a sensed actual air quantity delivered to the heater, to account for unmodelled control disturbances, such as exhaust gas backpressure perturbations or disturbances in the control environment.

Finally, contamination is minimized in the overall heating system by vaporizing fuel before entry to the system and controlling fuel vapor to the heater, as fuel vapor may be less likely to result in system contamination and consequent system performance degradation.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
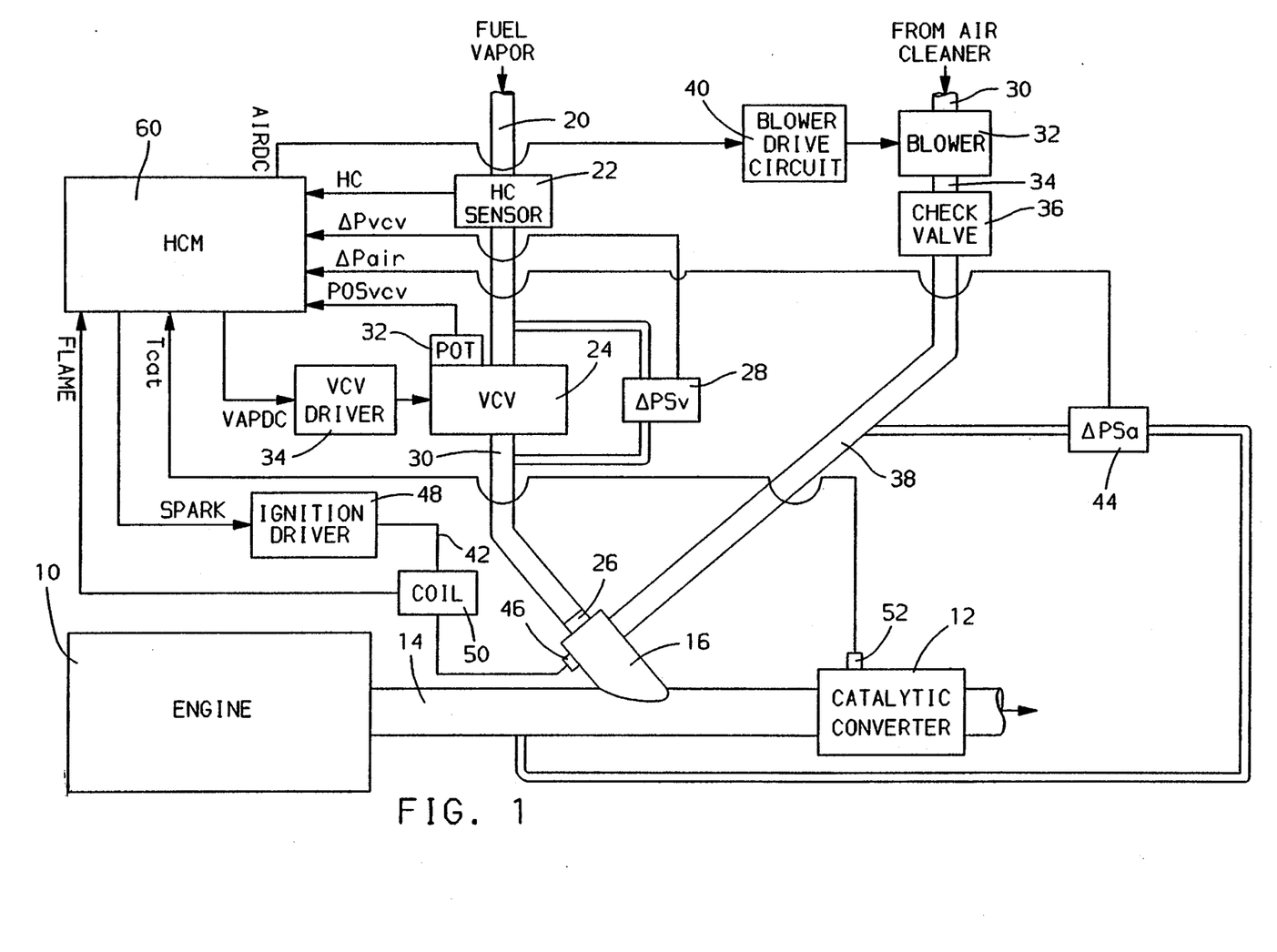
FIG. 1 is a general block diagram illustrating the hardware used in the preferred embodiment of the present invention.

FIG. 1 schematically illustrates a typical application of an exhaust heater assembly 16 controlled in accord with the present invention to the exhaust system of an internal combustion engine 10. The heater assembly is disposed in the exhaust system of the engine 10 in such a manner that engine exhaust gas passes from the engine 10 past the heater assembly 16 to a conventional catalytic converter 12, via exhaust path 14.

A heater control module HCM 60 monitors various input signals describing engine and exhaust system parameters, and varies fuel, air, and spark to the heater assembly 16 accordingly. The HCM 60 may be an eight-bit, single chip microcomputer, such as a conventional Motorola eight bit microcomputer, which executes a series of routines for heater control in accord with this invention, such as the routines described herein.

Combustion air is provided to the heater assembly 16 from an engine driven or electrical air blower 32. The blower receives intake air from an air cleaner, such as a standalone conventional air filter or a conventional engine air cleaner via conduit 30, and passes air out via conduit 34 to check valve 36. This check valve may be any conventional one-way valve which provides for low restriction air passage from the blower to the heater assembly 16, and provides for high restriction air passage from the heater assembly back to the blower, to minimize blower contamination from engine exhaust gasses. Air passing through check valve 36 is provided to heater assembly 16 via conduit 38.

The blower 32 is controlled by the HCM 60 via a blower command AIRDC, which may be in the form of a duty cycle at a predetermined frequency, such as 128 Hz. The command AIRDC is provided from HCM 60 to DRIVE CIRCUIT 40, a blower drive circuit, which for example may include conventional high current drivers which conduct, applying a predetermined supply voltage level across the blower, at a duty cycle prescribed by AIRDC. The rate at which air is passed from blower 32 to heater assembly 16 is then controlled according to the duty cycle of AIRDC.

Differential air pressure sensor ΔPSa 44 is interposed between conduit 38 and the engine exhaust gas path 14 upstream of and in close proximity to the heater assembly 16, to measure air pressure therebetween, such as through transduced measurement of movement of a diaphragm in sensor 44. The difference in pressure is provided to HCM 60 as a control input signal ΔPair.

Fuel vapor, as may be generated in a fuel tank (not shown) through operation of a conventional fuel vapor generating means, is provided to conduit 20, which guides the vapor past HC sensor 22, a conventional hydrocarbon HC sensor, to sense the concentration of HC in the fuel vapor as an indication of fuel vapor concentration passing by the HC sensor. The sensor 22 provides a signal HC proportional in magnitude to HC concentration in the fuel vapor.

The fuel vapor is guided to a vapor control valve VCV 24, such as a conventional linear electrically actuated solenoid valve, for example as commonly used in automotive exhaust gas recirculation control as is generally known in the art of exhaust gas heating. The VCV 24 meters fuel vapor from conduit 20 to conduit 30, which provides the metered vapor to venturi valve 26, which passes the metered vapor to the heater assembly 16.

The position of VCV 24 is controlled in accord with a HCM 60 generated command VAPDC, which may be a fixed frequency, fixed magnitude, variable duty cycle command issued to VCV driver 34. VCV driver 34 may be a generally known solenoid driver circuit, such as a closed loop current control circuit which provides a path for current to flow through VCV 24 while command VAPDC is high. Accordingly, the quantity of fuel vapor metered to the burner assembly 16 is controlled as prescribed by VAPDC.

Across VCV 24 is provided a differential vapor pressure sensor ΔPSv 28, which measures pressure drop across VCV 24, such as through measured movement of a diaphragm interposed between conduit 20 and conduit 30. A signal ΔPvcv indicative of the pressure drop across VCV 24 is output from sensor 28. A position sensor, such as conventional linear potentiometer POT 32, transduces position of VCV 24, and outputs a signal POSvcv indicative of the transduced position.

A conventional spark plug 46 may be used as an ignition source in heater assembly 16 to ignite the air/fuel mixture formed therein. A periodic control pulse SPARK is issued from the HCM 60 to an ignition driver 48, which may include a switch and a transformer, wherein the switch closes for the duration of each SPARK pulse to allow current to pass through a primary of the transformer charging up the transformer. At the falling edge of the pulse SPARK, the switch opens, interrupting current through the primary of the transformer, inducing current across the electrodes of the spark plug 46 which is connected across the transformer secondary coil. Such is in accord with general ignition control practice.

In the present embodiment in which heater ignition is provided through periodic arcing of a conventional spark plug 46, heater combustion detection may be provided using the combustion detection method and apparatus described in copending application U.S. Ser. No. 07/902249, filed Jun. 22, 1992, entitled "Combustion Detection," assigned to the assignee of this application. In general, a sense coil 50, of approximately 200 turns, such as a Wabash Magnetics solenoid, part no. 5234214, surrounds the spark plug drive line 42 in such a manner that changes in current through the drive line will, in according to well-established principles of electromagnetic field theory, induce current through the coil, and thus will induce potential across the coil 50, which may be monitored by HCM 60, via coil output signal Vsense.

In the absence of flame in heater assembly 16, a comparatively large voltage spike will appear across coil 50 shortly after the surge of spark inducing current passes through drive line 42. However, a comparatively small spike will appear across coil 50 when flame is present, due to an ionization effect, wherein current carrying ions are provided across the spark plug gap by flame present in proximity to the gap, reducing the electrical resistance across the gap. By distinguishing between the two spikes, as described in the above-referenced copending application, the HCM 60 may rapidly and reliably determine whether flame is present in the heater assembly 16.

The temperature of the heater assembly 16 or alternatively of the catalytic converter 12 is monitored using temperature sensor 52, such as a conventional thermocouple or thermistor. The temperature is communicated to HCM as a signal Tcat. The routine used to carry out this invention in accord with the preferred embodiment is illustrated in FIGS. 2a-2e, and is entered at step 100 of FIG. 2a. This routine represents a series of instructions stored in HCM 60 non-volatile memory (not shown), for periodic sequential execution initiated by the occurrence of a periodic event, such as a conventional time-based HCM interrupt. For example, in the present embodiment, the routine is executed approximately every 6.25 milliseconds while power is applied to the system, such as when a vehicle ignition switch is rotated to its on position, providing power to the HCM 60.

The present invention provides for rapid, robust heating of engine exhaust gas, for minimum time to catalytic converter light-off and for exhaust system temperature protection. In the present embodiment, the invention is carried out through a heating cycle that may operate each time power is applied to engine 10 (FIG. 1). The heating cycle includes eight control states which are executed sequentially to vary commanded fuel and air to the heater assembly 16 (FIG. 1).

Specifically, state zero is executed first as a heater initialization state. State one follows from state zero and continues to operate for two seconds or until combustion is detected in the heater assembly 16 (FIG. 1). If combustion is detected, state two is activated for a period of time, such as one second in this embodiment, during which time energy delivered from the heater assembly to the exhaust gas is rapidly increased from the level of state one to a maximum level.

After state two, state three is entered and executed for a period of time, such as four seconds in this embodiment, during which time fuel and air are provided to the heater assembly to transfer maximum heat energy to the exhaust gas path. After four seconds in state three, state four is activated for a predetermined period of time, such as approximately seven seconds in this embodiment, during which time heat energy is reduced to maintain exhaust gas heating at a constant level while the catalytic converter 12 (FIG. 1) heats up therefrom.

After state four, state five is activated for a predetermined period of time, such as four seconds in this embodiment, during which time fueling of the heater is discontinued, and an attempt is made to ignite any residual combustible mixture in the heater. After state five, state six becomes active for a predetermined period of time, such as 19 seconds in this embodiment, during which time ignition commands to the heater are discontinued, and air metering to the heater continues to enlean the exhaust gas, to provide a reduced level of carbon monoxide and hydrocarbons in the exhaust gas by increasing catalytic converter efficiency, consistent with generally known emission control goals. Finally, after state six, state seven is entered and executed to provide a controlled end to the heating cycle.

Figure 2A:
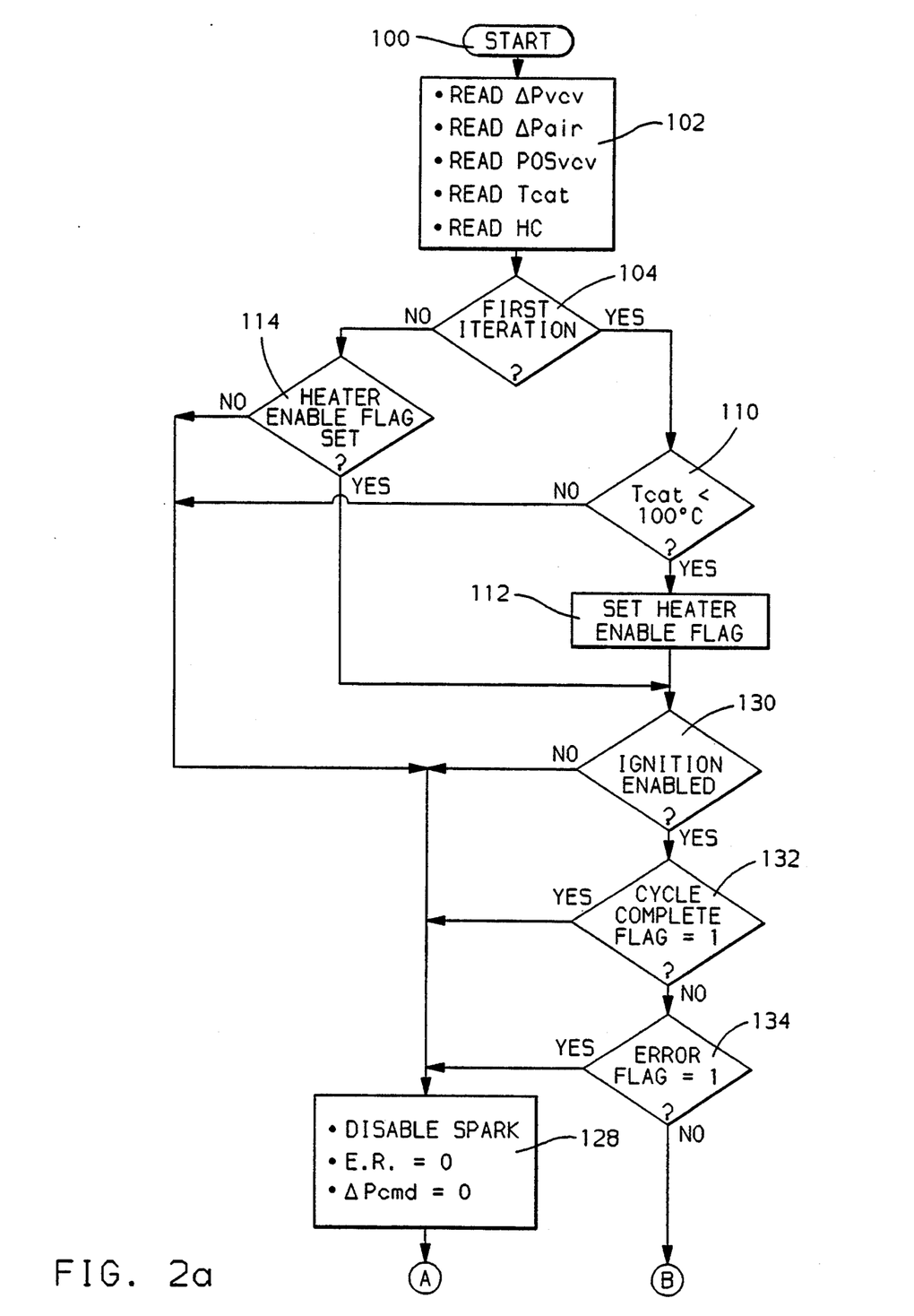
FIGS. 2a-2e are computer flow diagrams illustrating the steps used to carry out this invention in accord with the preferred embodiment.
Figure 2B:
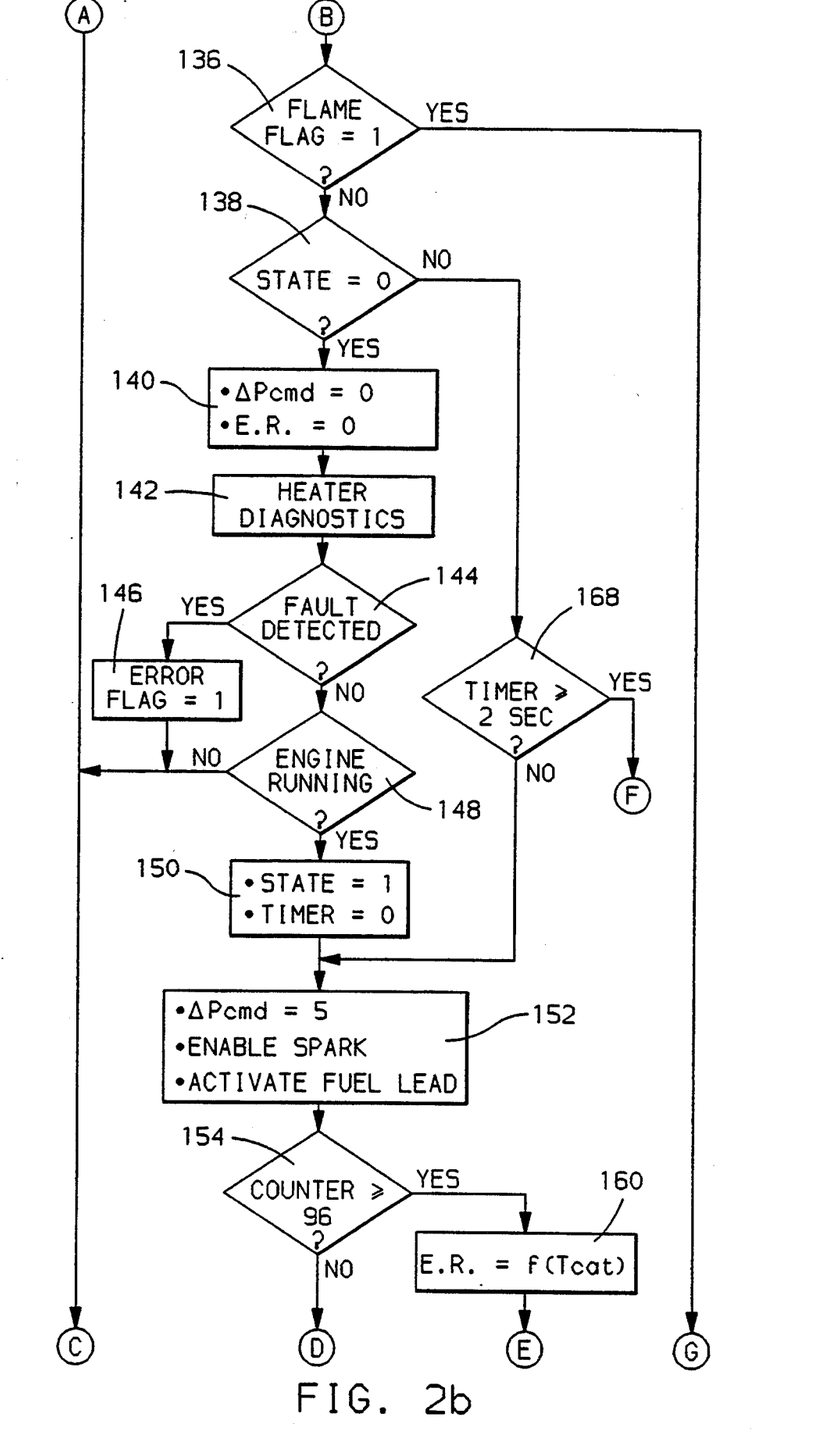
Figure 2C:
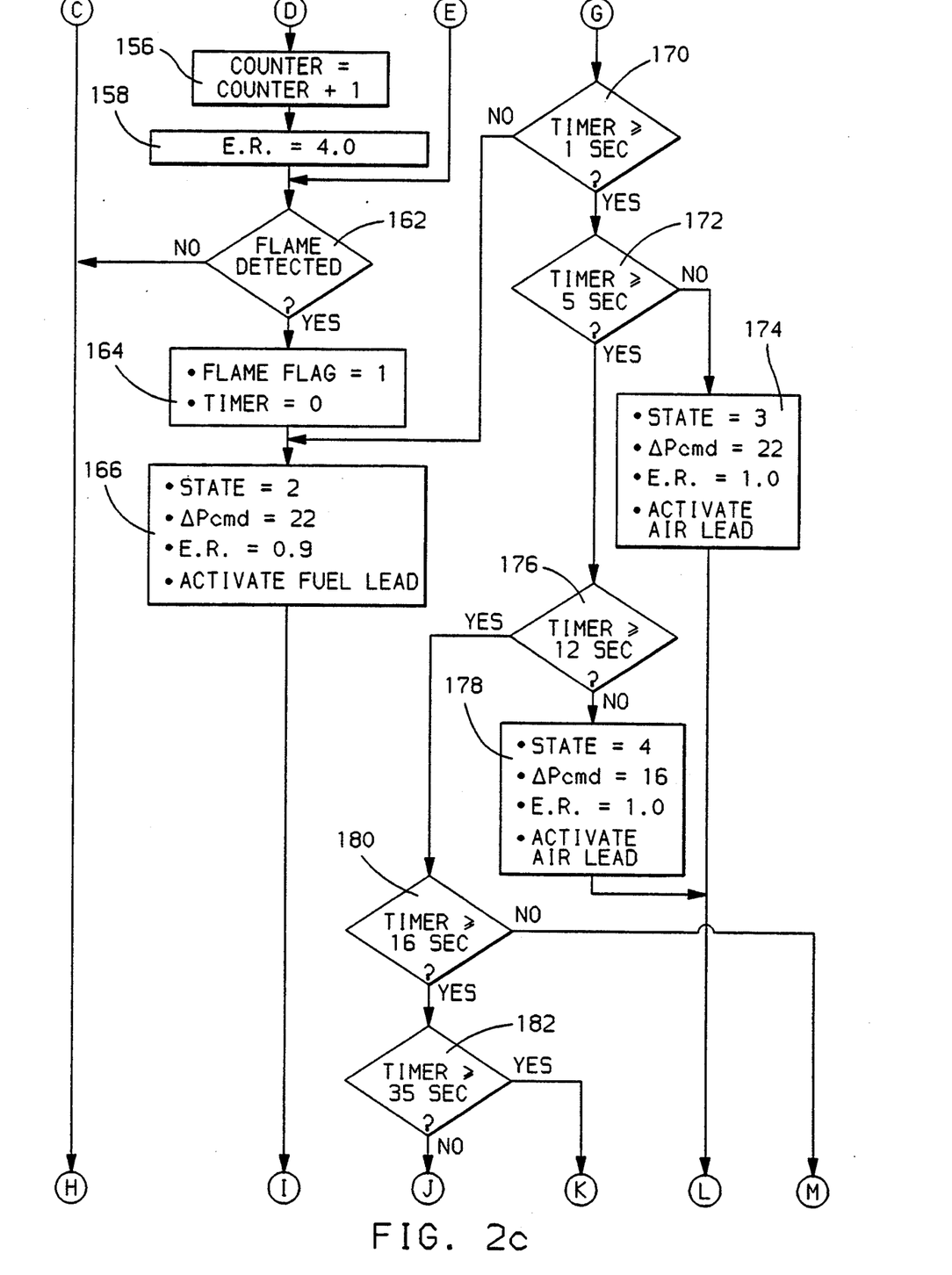
Figure 2D:
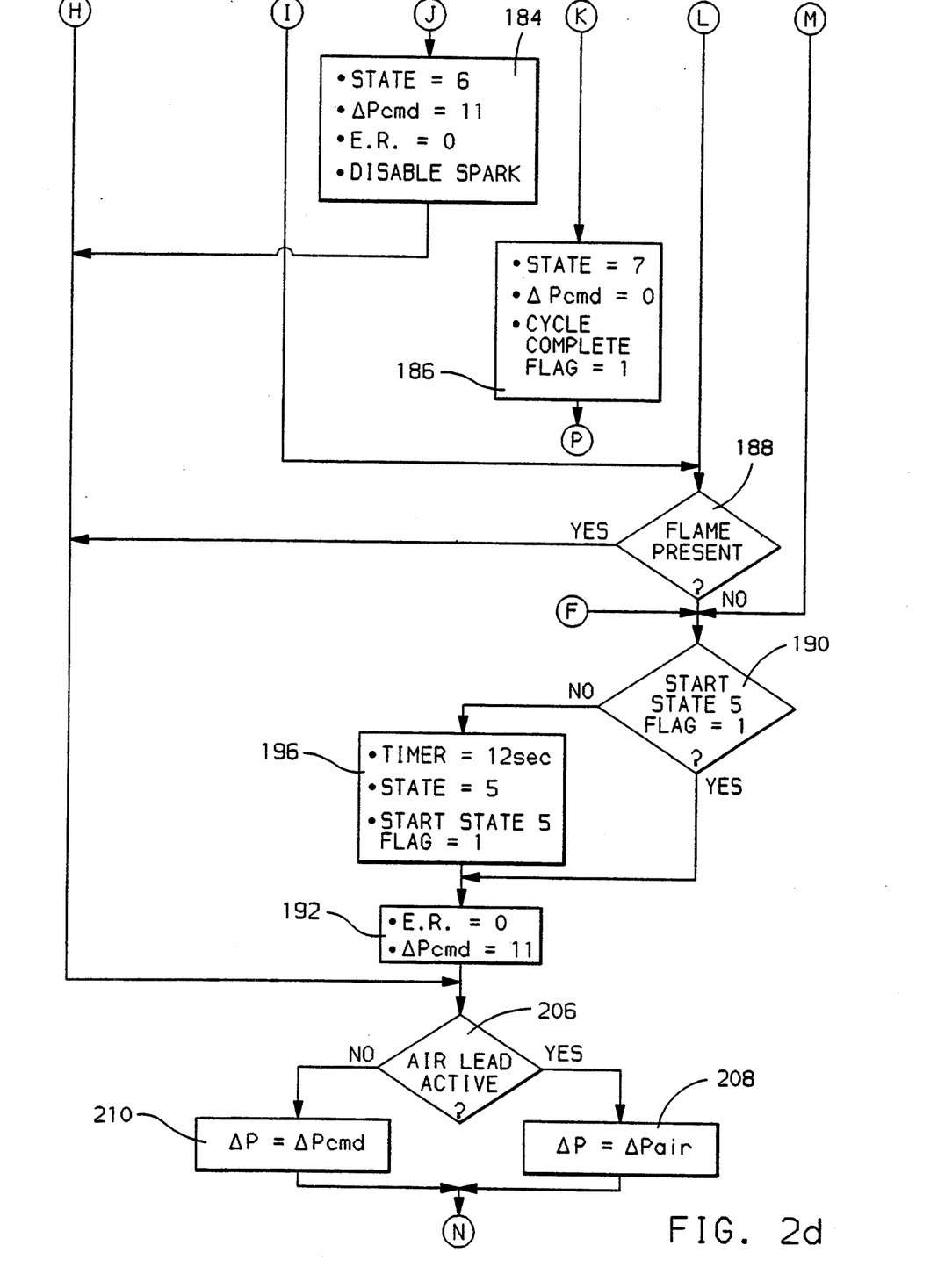
Figure 2E:
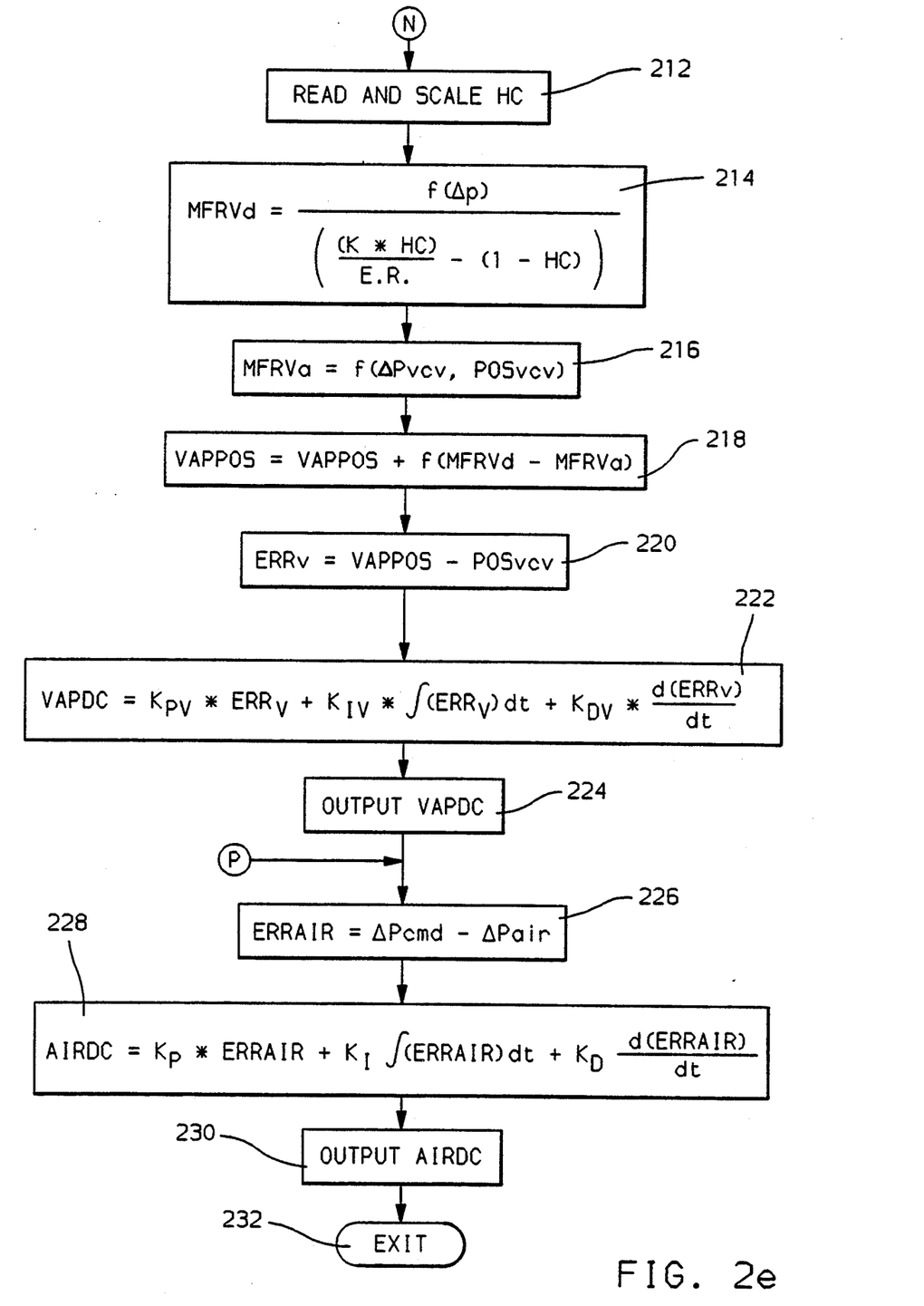

Returning to the routine of FIGS. 2a–2e, which illustrate steps used to carry out this eight state control approach, entry into the routine is made at step 100 of FIG. 2a, and then the routine flows to step 102, to read a present value for above-described HCM 60 input signals, including ΔPvcv, ΔPair, POSvcv, and Tcat.

The routine then moves to step 104, to determine if the present iteration of the routine of FIGS. 2a–2e is the first since power was applied to the HCM 60 (FIG. 1). If so, the routine moves to step 110, to determine if the catalytic converter 12 (FIG. 1) is of sufficient temperature that external heating through operation of heater assembly 16 (FIG. 1) is assumed to be unnecessary for rapid light-off. In this embodiment, if Tcat is above 100 degrees Celsius at step 110, heater assembly operation is avoided by not setting a heater enable flag, and by moving to step 128, to clear heater control commands, by setting E.R. and ΔPcmd to zero, and by stopping HCM output of ignition command signal SPARK.

Alternatively at step 110, if Tcat is below 100 degrees Celsius, the routine moves to step 112, to set the heater enable flag, and then moves to step 130, to determine if the ignition power that initially invoked the routine of FIGS. 2a–2e is still on. Such may be checked by monitoring an ignition power line (not shown) input to the HCM 60. In this embodiment, heater operations are not executed unless ignition power is maintained and the engine 10 (FIG. 1) is running. Accordingly, if ignition power is not applied as determined at step 130, the routine moves to step 128, to discontinue further heater operations, to be described, and if ignition is enabled at step 130, the routine moves to step 132, to determine if a cycle complete flag is set indicating the present heating cycle is complete.

If the cycle complete flag is set at step 132, the routine moves to step 128, to discontinue further heater assembly operation, as described. If the cycle complete flag is not set at step 132, the routine moves to step 134, to determine if any prior heating control errors were detected during the present heater cycle, as indicated by an error flag being set to one. Such errors may be detected through application of generally known diagnostics to the system described in FIG. 1, such as at step 142 of the present routine, to be described. If an error is indicated by error flag being set to one at step 134, the routine interrupts heater assembly operation for the present cycle by moving to step 128, as described. If the error flag is clear at step 134, the routine moves to conduct heating operations in accord with the present embodiment, starting at step 136.

Specifically, at step 136, flame flag is checked to determine if flame (combustion) has been detected in the heater assembly 16 (FIG. 1) since the start of the present heater cycle. Flame is detected at a later step of the present routine, to be described, at which time flame flag will be set to one. If flame flag is set to one at step 136, then of the eight control states included in the control approach of the present embodiment, a first control state (state zero) directed to heater initialization and a second state (state one) directed to initiating combustion in the heater assembly are no longer needed for the present cycle, and thus the control of the present routine advances to states 2–7 via step 170, to be described.

Alternatively, if flame flag is clear at step 136, the routine moves to step 138, to determine whether STATE, a flag indicating the present control state, is set to zero, indicating state zero is presently active. If so, the routine moves to steps 140–148 to carry out state zero operations. Alternatively, if STATE is not zero, and flame flag was not set at step 136 as described, state one must be active, and the routine moves to state one operations starting at step 168, to be described. STATE is automatically reset to zero via conventional memory initialization operations at HCM 60 power-up.

Returning to step 104, if the present iteration of the routine of FIGS. 2a–2e is not the first in the present heating cycle, the routine moves to step 114, to determine if the heater enable flag is set, indicating heater operations are required, as described. If so, the routine moves to the previously described step 130. If the heater enable flag is not set, the routine moves to step 128, to discontinue further heater operations, as described.

State zero operations of the present embodiment include heater initialization functions. As described, STATE, which is reset to zero at the start of a new heater cycle, indicates the present heater control state. If STATE is zero at step 138, the routine moves to step 140, to initialize heater control commands, by setting ΔPcmd and E.R. to zero, and by disabling purge. The routine then moves to step 142, to carry out conventional system diagnostics, for example checking that HCM input signal levels are within predetermined ranges and are reasonable with respect to each other. Next, the routine moves to step 144, to determine if a fault was discovered in the conventional diagnostics of step 142. If so, the routine moves to step 146, to set error flag to one, indicating the fault. The routine then moves to step 206, to be described.

Alternatively at step 144, if no fault was detected through the diagnostic operations of step 142, the routine moves to step 148, to determine if the engine is running, such as indicated by engine speed RPM exceeding 400 r.p.m. If the engine is not running, the next state, state one, will not be executed, by moving to step 206, to be described. Otherwise, if the engine is determined to be running at step 148, the routine moves to state one operations, including steps 150-164.

As described, state one attempts to light the heater assembly 16 (FIG. 1), by setting appropriate fuel, air and spark commands to the heater assembly. Specifically in state one, STATE is set to one and TIMER, a real time variable is cleared at step 150. TIMER is used to monitor the amount of real time in state one and, in this embodiment, is periodically updated in a conventional background loop to reflect the amount of elapsed real time since TIMER was last reset. TIMER is used in state one at step 168, to determine the amount of time in state one without detected flame in the heater assembly 16 (FIG. 1).

In this embodiment at step 168, if more than two seconds of operation in state one take place without detected flame, a fault condition is assumed, and further combustion attempts are discontinued by moving from step 168 (of state one) to step 190 (state 5), to be described. However, state one operation is continued by moving to step 152 if TIMER is less than two seconds at step 168. Step 152 is also executed after step 150, in the case of a first pass through state one operations.

At step 152, fuel, air, and spark commands are set in a predetermined manner to achieve rapid combustion in the heater assembly 16. Sufficient levels of fuel vapor and air must be present in the heater assembly to support combustion when the spark plug 46 (FIG. 1) is firing. However, metering air or fuel vapor in at too rapid a rate may overwhelm the system, unnecessarily delaying combustion. In this embodiment, a commanded air rate equivalent to a pressure drop across pressure sensor 44 of approximately five inches of water (0.184 p.s.i.) provides a combustion compatible heater intake air rate without blowing any fuel resident in heater assembly 16 (FIG. 1) out of the combustion area of the heater assembly.

After setting an air command rate at step 152, spark is enabled, such that periodic spark commands will be issued from HCM 60 (FIG. 1) to ignition driver 48, causing spark plug 46 to periodically spark. As described, spark commands are issued approximately every 15.625 milliseconds in the present embodiment. Further at step 152, fuel lead control is activated, wherein fuel vapor is commanded to the heater assembly 16 (FIG. 1) based on $\Delta Pcmd$ and without adjustment for sensed air rate $\Delta Pair$.

While air lead control, in which a commanded fuel vapor rate is adjusted for sensed air rate, provides beneficial compensation for such system disturbances as exhaust system backpressure changes, fuel lead control is necessary early in the heater control cycle, such as during engine cranking, when the $\Delta Pair$ signal has a high potential to contain noise spikes, which may provide a misleading indication of measured heater intake air rate. However, air-lead control may be more appropriate after potential for injection of noise into the $\Delta Pair$ signal decreases, such as after initial engine cranking. Accordingly, the control in this embodiment of the invention switches from fuel lead to air lead at an appropriate time in the control cycle, such as at a time when a relatively "clean" $\Delta Pair$ signal may be provided from sensor 44.

Continuing with step 152 of the present routine, fuel lead is activated, such as by setting a fuel lead flag in HCM 60 memory. The routine then moves to step 154, to compare COUNTER to a predetermined value, such as 96 in the present embodiment. COUNTER is cleared each time power is applied to a disabled HCM 60, and is used to count the number of iterations of the present routine while in state one. If COUNTER is less than 96 at step 154, the routine moves to step 156, to increment COUNTER by one and then the routine moves to step 158, to set E.R. to a predetermined value, such as 4.0, corresponding to a rich fuel vapor/air ratio. Such a rich fuel/air ratio is commanded in the present embodiment for a calibrated initial period, such as for the first 96 iterations in state one, to support rapid filling of the vapor conduit 30 (FIG. 1) for the predetermined number of iterations of the present routine, such as 96. After the 96 iterations, the conduit 30 is assumed filled, and the present routine will move from step 154 to step 160, to set E.R. to a value predetermined in a conventional calibration step as a function of Tcat, to meter fuel in a manner calibrated to rapidly light the heater assembly 16. The function of Tcat should account for the generally understood temperature effect on combustion of an air/fuel mixture.

After setting E.R. to an appropriate value at either of steps 158 or 160, the routine moves to step 162, to determine whether flame is present in the heater assembly from the magnitudinal relationship between the signal Vsense (FIG. 1), as input to the HCM 60, and a predetermined threshold voltage, as described in copending application U.S. Ser. No. 07/902249, filed Jun. 22, 1992, entitled "Combustion Detection," assigned to the assignee of this application. If flame is determined to be present at step 162, the routine moves to step 164, to set flame flag to one, and to clear TIMER, to start a new time period indicating the amount of time combustion has been present in the heater assembly 16 (FIG. 1).

After step 164, the routine moves to steps 166-192 to execute control states 2-7, for heater air/fuel control in accord with the present embodiment. Alternatively at step 162, if flame is determined not to be present, the routine moves to step 206, to be described.

Returning to step 162, state two is entered at step 164 when flame is detected during operation in state one, as described. The routine then moves to step 166, to set STATE to two, to set $\Delta Pcmd$ to a level which is predetermined to produce a pressure drop across pressure sensor 44 (FIG. 1) of approximately 22 inches of water, to set E.R., the commanded air/fuel ratio, to 0.9, and to activate fuel lead control. As described, state two attempts to rapidly increase heat energy to the exhaust gas from the levels of state one. Furthermore, as discussed, fuel lead control is preferred in state two, as a significant potential remains for noise infecting the pressure sensor output signal $\Delta Pair$. After setting state two parameters at step 166, the routine moves to step 188, to again check for the presence of flame (combustion) in the heater assembly 16 (FIG. 1).

Returning to step 136, if flame flag is set, the routine bypasses state one to step 170, to determine the amount of time combustion has been present in the heater assembly 16 (FIG. 1). If, at step 170, TIMER is less than one second, state two is active, and the routine moves to step 166, as described. If TIMER exceeds or is equal to one second at step 170, state two is complete, and the routine moves to step 172, to compare TIMER to five seconds. If TIMER is less than five seconds, the routine moves to state three operations at step 174, by setting STATE to three, holding ΔPcmd at 22 inches of water equivalent pressure drop across pressure sensor 44 (FIG. 1), increasing E.R. to 1.0, and activating air lead control.

As described, state three attempts to drive maximum heat energy to the heater assembly 16 through high fuel and air commands in proper proportion. As such, the air/fuel ratio command magnitude as dictated by E.R. is set at a maximum level in state three, consistent with maximum desired heat transfer to heater assembly 16 (FIG. 1). Furthermore, in state three, there is sufficient confidence in the pressure sensor 44 output signal to allow air lead control to become active, in which the fuel command follows from the air rate detected into the heater assembly 16. After setting state three parameters at step 174, the routine moves to the described step 188.

Returning to step 172, if TIMER exceeds or is equal to five seconds, state three is complete, and the routine moves to step 176, to compare TIMER to twelve seconds, to determine whether state four is active. State four reduces commanded fuel and air to the heater assembly to a degree predetermined to hold the temperature of the catalytic converter at a substantially steady level.

Accordingly at step 176, if TIMER is less than twelve seconds, the routine moves to step 178, to set state four parameters, including setting STATE to four, setting ΔPcmd to a level predetermined to provide a pressure drop across pressure sensor 44 (FIG. 1) of about 16 inches of water, holding E.R. at 1.0, and maintaining air lead as active. The routine then moves to the described step 188.

Alternatively at step 176, if TIMER exceeds or is equal to twelve seconds, state four is complete, and the routine moves to step 180, to compare TIMER to sixteen seconds. If TIMER is less than sixteen seconds at step 180, state five, the vapor blowdown state, is assumed to be active, and the routine moves to step 190, to determine whether a start state five flag is set to one, indicating state five has previously been active. If the flag is clear, the routine moves to step 196, to set TIMER to twelve seconds, to insure a precise amount of purge time for the system (four seconds in this embodiment), as TIMER may be significantly below or above twelve seconds at the start of state five. Additionally at step 196, STATE is set to five, and the start state five flag is set.

Next, or if the start state five flag was determined at step 190 to already be set, the routine moves to step 192, to clear E.R., so as to discontinue metering of fuel from the fuel control module 24 (FIG. 1), and to set ΔPcmd to a value equivalent to eleven inches of water pressure drop across pressure sensor 44 (FIG. 1). The routine then moves to step 206, to be described.

Returning to step 180, if TIMER exceeds or is equal to sixteen seconds, the routine moves to step 182, to compare TIMER to 35 seconds, to determine if state six is active. IF TIMER is less than 35 seconds, the routine moves to step 184, to set state six parameters, by setting ΔPcmd to a rate predetermined to provide pressure drop of approximately eleven inches of water across pressure sensor 44 (FIG. 1), by setting E.R. to 0, to discontinue fueling the heater assembly 16 (FIG. 1), and to disable spark. The routine then moves to step 206, to be described.

Alternatively at step 182, if TIMER exceeds 35 seconds, the routine moves to state seven at step 186, to set the air command ΔPcmd to zero, to set STATE to seven, and to set the cycle complete flag, to discontinue further heater control operations in accord with the present routine. The routine then moves to step 226, to be described.

Steps 206–232 are executed to apply the E.R. and ΔPcmd, as determined through operation of the routine of FIGS. 2a–2e, in a determination of an appropriate fuel and air command to fuel control module 24 (FIG. 1) and blower 32 (FIG. 1) respectively. Specifically, at step 206, a check is made to determine whether air lead has been activated, such as in states three and four of the present routine. If air lead is active, the routine moves to step 208, to set a value ΔP equal to ΔPair, the measured pressure drop across pressure sensor 44 (FIG. 1). Alternatively at step 206, if air lead is not active, fuel lead must be active, such as in states one and two, and the routine moves to step 210, to set ΔP to ΔPcmd, the commanded air rate.

ΔP will be used in a determination of a fuel command. In air lead control, fuel follows a measured air rate to the heater assembly 16 (FIG. 1), such that commanded fuel to the heater assembly 16 should be a function of ΔPair, as provided for in step 208. However in fuel lead control, fuel may be commanded without regard to the measured air rate, as provided for in step 210.

After setting ΔP at either of steps 208 or 210, the routine moves to step 212, to read and scale the output signal HC from HC sensor 22 (FIG. 1), which indicates the hydrocarbon level in the fuel vapor passing through conduit 20 (FIG. 1). The routine then moves to step 214, to determine MFRVd, a desired mass flow rate of fuel vapor to heater assembly 16 (FIG. 1), as a predetermined function of ΔP, E.R., and HC, relating air rate as reflected by ΔP, desired air/fuel ratio as reflected by E.R., and vapor concentration as reflected by HC into a rate at which vapor mass should be directed to the heater assembly 16 (FIG. 1), in accord with generally understood vapor control principles, and consistent with well-established air/fuel ratio control practices.

After determining MFRVd at step 214, the routine moves to step 216, to determined the actual mass flow rate of vapor to the heater assembly MFRVa, as a predetermined function of the pressure drop ΔPvcv across the vapor control valve 24 (FIG. 1), and of the vapor control valve position POSvcv, through application of the well-known relationship between flow rate, and pressure drop across an orifice of known size.

The routine then moves to step 218, to determine a desired vapor control valve position VAPPOS, as follows $$VAPPOS = VAPPOS + f(MFRVd - MFRVa)$$

wherein a function directly proportional to error in mass flow rate, as indicated by the difference between desired and actual mass flow rates of vapor, is used to augment VAPPOS. For example, the function relating error in mass flow rate to change in VAPPOS may be calibrated in a conventional calibration step for the specific hardware to which the control in accord with this embodiment is applied, as the degree of change in vapor control valve position needed to drive the error toward zero expeditiously.

After determining VAPPOS at step 218, a vapor control valve position error value ERRv is determined at step 220, as the difference between VAPPOS and the measured position of the vapor control valve POSvcv. Next, ERRv is applied at step 222 in a determination of VAPDC, the duty cycle to be applied to the VCV driver circuit 34 (FIG. 1). In this embodiment, VAPDC is determined through application of a well-known classical control theory approach, although the inventors intend that any conventional control approach may be used to moderate VAPDC so as to control the position of the vapor control valve in a desirable way. Specifically in the present embodiment, VAPDC is determined via conventional classical proportional-plus-integral-plus-derivative control as follows $$VAPDC = K_{pv} * ERRv + K_{iv} * \int ERRv + K_{dv} * d(ERRv)/dt$$

in which values for $K_{pv}$, $K_{iv}$, and $K_{dv}$ may be selected through application of conventional classical control theory analyses as providing desirable system transient response and tolerable steady state error in ERRv.

After determining VAPDC at step 222, the routine moves to step 224, to output VAPDC as a duty cycle of the 128 Hz signal communicated to the VCV driver 34 (FIG. 1), as described. The routine then moves to air control command determination, starting at step 226, at which air command error ERRAIR is determined as the difference between ΔPcmd, the commanded pressure drop across pressure sensor 44 (FIG. 1) and ΔPair, the measured (actual) pressure drop across the pressure sensor. In accord with generally known classical control theory principles, ERRAIR is used at the next step 228 in a proportional-plus-integral-plus derivative control term to calculate the duty cycle of the blower 32 (FIG. 1), as follows $$AIRDC = K_p * ERRAIR + K_I * (\int ERRAIR)dt + K_d * d(ERRAIR)/dt$$

in which $K_p$ is a predetermined proportional term gain, $K_I$ is an integral term gain, and $K_d$ is a derivative term gain, as generally known in the art, wherein such gains are selected in accord with a desired air control transient response, and a desired steady state error in the air term.

After determining AIRDC, the routine moves to step 230, to output AIRDC to drive circuit 40, for application as a drive current to blower 32 (FIG. 1), as described. The present routine is then exited at step 232, to resume execution of any HCM 60 (FIG. 1) processes that were interrupted by the execution of the routine of FIGS. 2a-2e.

As described, the routine of FIGS. 2a-2e will repeat approximately every 6.25 milliseconds while the HCM is operating in the manner described. Operation of the HCM 60 (FIG. 1) may be terminated at the end of each heating cycle, such as after VAPDC and AIRDC return to zero in state seven of the present routines, such that heater operations would not resume until a subsequent engine restart.

The description of the preferred embodiment for the purpose of explaining this invention is not to be taken as limiting or restricting the invention since many modification may be made through the exercise of skill in the art without departing from the scope of the invention.

The embodiments of the invention in which a property or privilege is claimed are described as follows:

1. A method for controlling a commanded fuel vapor quantity and a commanded air quantity admitted to an exhaust gas heater, comprising the steps of:
   providing for combustion in the heater by setting a desired air quantity to a predetermined lighting air quantity and by setting a desired heater air/fuel ratio to a predetermined lighting air/fuel ratio;
   sensing combustion in the heater;
   providing for a rapid increase in heater energy output upon sensing combustion in the heater by setting the desired air quantity to a predetermined ramp air quantity and setting the desired heater air/fuel ratio to a predetermined ramp air/fuel ratio;
   adjusting the commanded air quantity in accord with the set desired air quantity; and
   adjusting the commanded fuel vapor quantity in accord with the set desired heater air/fuel ratio and a predetermined one of the set desired air quantity and the adjusted commanded air quantity.

2. The method of claim 1, further comprising the steps of:
   estimating when heater energy output has reached a predetermined maximum output; and
   stabilizing engine exhaust gas temperature when heater output energy is estimated to have reached the predetermined maximum output, by setting the desired air quantity to a predetermined hold air quantity and setting the desired heater air/fuel ratio to a predetermined hold air/fuel ratio.

3. The method of claim 2, further comprising the step of:
   enleaning an air/fuel ratio in the engine exhaust gas by setting the desired air quantity to a predetermined enleanment air quantity and setting the desired air/fuel ratio to a predetermined enleanment air/fuel ratio.

4. The method of claim 1, further comprising the steps of:
   estimating a concentration of fuel vapor admitted to the heater; and
   adapting the adjusted commanded fuel vapor quantity in accord with the estimated concentration.

5. The method of claim 1, further comprising the steps of:
   sensing when combustion is not present in the heater; and
   stopping admission of the commanded fuel vapor quantity to the heater upon sensing that combustion is not present in the heater.

6. A method for controlling a commanded fuel quantity and a commanded air quantity admitted to an exhaust gas heater in which the fuel quantity and the air quantity are combined and ignited to generate heat energy used to heat internal combustion engine exhaust gas, comprising the steps of:
   providing for combustion in the heater by setting a desired air quantity to a predetermined lighting air quantity and by setting a desired heater air/fuel ratio to a predetermined lighting air/fuel ratio;
   sensing combustion in the heater;
   providing for a rapid increase in heater energy output upon sensing combustion in the heater by setting the desired air quantity to a predetermined ramp air quantity and setting the desired heater air/fuel ratio to a predetermined ramp air/fuel ratio;
   estimating when heater energy output has reached a predetermined maximum output;

minimizing change in engine exhaust gas temperature for a predetermined period of time after having estimated that heater energy output has reached the predetermined maximum output, by setting the desired air quantity to a predetermined hold air quantity and setting the desired heater air/fuel ratio to a predetermined hold air/fuel ratio;

enleaning an air/fuel ratio in the engine exhaust gas after minimizing change in engine exhaust gas temperature for the predetermined period of time by setting the desired air quantity to a predetermined enleanment air quantity and setting the desired heater air/fuel ratio to a predetermined enleanment air/fuel ratio;

sensing an actual air quantity admitted to the heater;

determining air error as the difference between the set desired air quantity and the sensed actual air quantity;

determining an air correction value as a predetermined function of the determined air error;

adjusting the commanded air quantity by the determined air correction value;

determining a desired quantity of fuel vapor to be admitted to the heater as the quantity of fuel vapor needed, for a predetermined air quantity selected from the set including the set desired air quantity and the sensed actual air quantity, to drive an actual heater air/fuel ratio toward the set desired heater air/fuel ratio; and generating a fuel vapor command as a predetermined function of the desired quantity of fuel vapor.

7. The method of claim 6, further comprising the steps of:

estimating a concentration of fuel vapor admitted to the heater; and adjusting the generated fuel vapor command in accord with the estimated concentration.

8. The method of claim 6, further comprising the steps of:

sensing when combustion is not present in the heater; and stopping admission of the commanded fuel vapor quantity to the heater upon sensing that combustion is not present in the heater.

* * * * *